(12) United States Patent
West et al.

(10) Patent No.: US 8,171,716 B2
(45) Date of Patent: May 8, 2012

(54) SYSTEM AND METHOD FOR FUEL AND AIR MIXING IN A GAS TURBINE

(75) Inventors: James Anthony West, Simpsonville, SC (US); Samuel David Draper, Simpsonville, SC (US); Hasan Ul Karim, Simpsonville, SC (US); Christopher John Mordaunt, Mifflinburg, PA (US)

(73) Assignee: General Electric Company, Schenectady, NY (US)

( * ) Notice: Subject to any disclaimer, the term of this patent is extended or adjusted under 35 U.S.C. 154(b) by 7 days.

(21) Appl. No.: 11/846,209

(22) Filed: Aug. 28, 2007

(65) Prior Publication Data
US 2009/0056334 A1    Mar. 5, 2009

(51) Int. Cl.
*F02C 1/00* (2006.01)
(52) U.S. Cl. .................. 60/39.27; 60/737; 60/39.59

(58) Field of Classification Search ............. 60/737, 60/738, 776, 39.465, 779, 39.091, 39.094, 60/39.59, 39.463; 220/745–750
See application file for complete search history.

(56) References Cited

U.S. PATENT DOCUMENTS

| | | | |
|---|---|---|---|
| 5,477,671 A * | 12/1995 | Mowill | 60/39.23 |
| 6,595,003 B2 * | 7/2003 | Dalla Betta et al. | 60/777 |
| 6,625,971 B2 * | 9/2003 | Graves | 60/776 |
| 7,089,745 B2 * | 8/2006 | Roby et al. | 60/776 |
| 2001/0049932 A1 * | 12/2001 | Beebe | 60/39.06 |
| 2007/0125091 A1 * | 6/2007 | Roby et al. | 60/776 |

OTHER PUBLICATIONS

Chinese First Office Action for Chinese Patent Application No. 200810212527.5, issued Feb. 24, 2011.

* cited by examiner

*Primary Examiner* — Ehud Gartenberg
*Assistant Examiner* — Vikansha Dwivedi
(74) *Attorney, Agent, or Firm* — Cantor Colburn LLP

(57) ABSTRACT

A gas turbine system including a source of gas coupled to a source of fuel wherein the gas and the fuel are combined to form a mixture of gas and fuel prior to the mixture being introduced to a fuel nozzle of the gas turbine system.

6 Claims, 6 Drawing Sheets

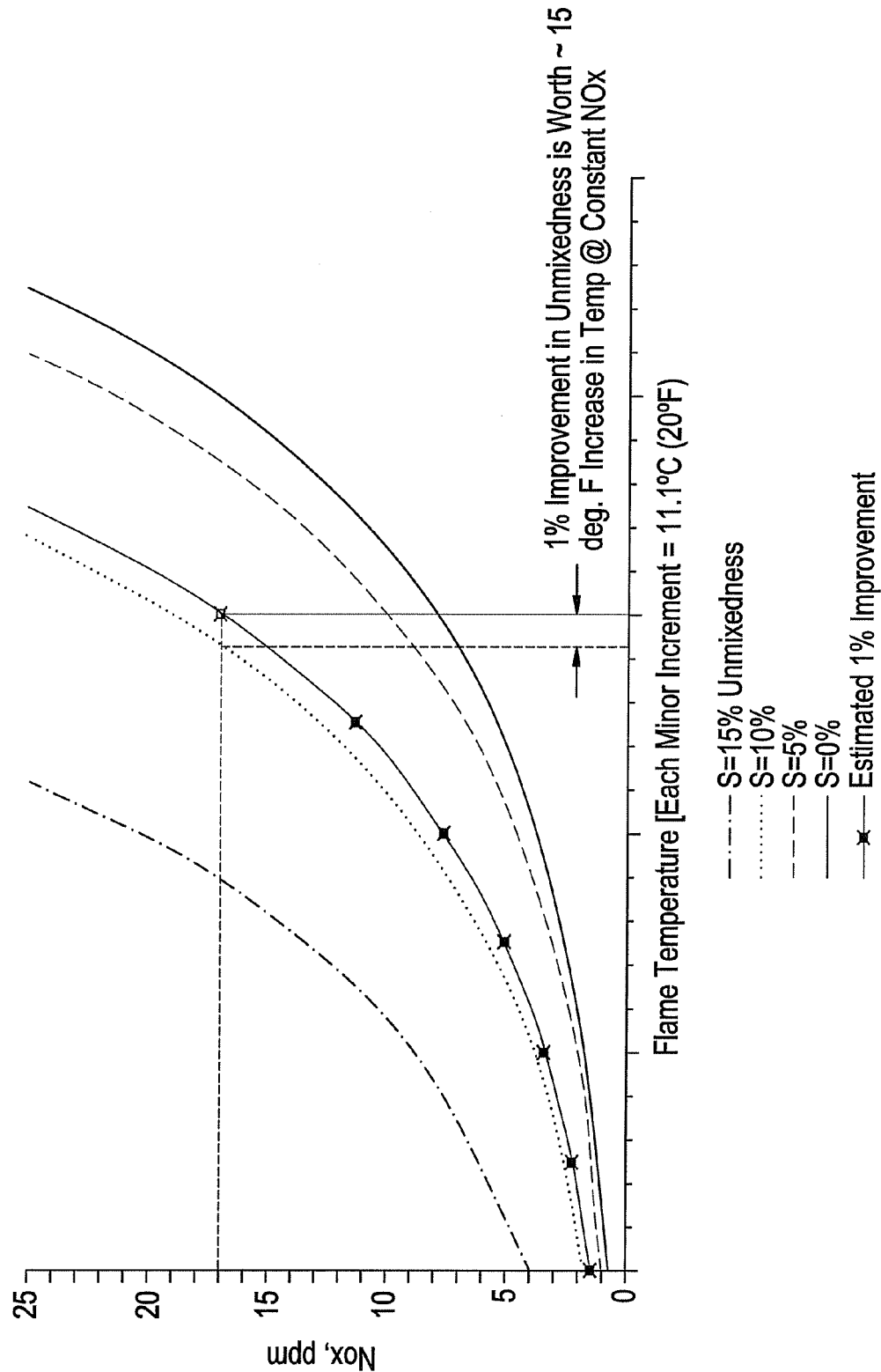

SYSTEM AND METHOD FOR FUEL AND AIR MIXING IN A GAS TURBINE

BACKGROUND OF THE INVENTION

1. Field of the Invention

The invention disclosed herein relates to the field of gas turbines and, in particular, to increasing the efficiency and limiting the emissions of lean premixed gas turbines.

2. Description of the Related Art

Gas turbines are used to generate a significant portion of electricity to the public and industry. It is important for the gas turbines to operate efficiently and with low emissions. Several operating factors can influence efficiency and emissions.

Combustion temperature in a combustion chamber of a gas turbine is one factor that can influence efficiency. Generally, an increase in the combustion temperature results in an increase in efficiency.

The amount of mixing of fuel and air prior to combustion can influence emissions. During lean premixed combustion, if the fuel and air are not properly mixed, then local areas in the combustion chamber can have mixtures that are either richer or leaner than the surrounding mixture. These richer mixtures burn at higher temperatures than the average combustion temperature and create what are known as "hot zones." The hot zones generally contribute to larger rates of production of nitrous oxides ($NO_x$). Conversely, leaner mixtures burn at temperatures lower than the average combustion temperature. Combustion of the lean mixtures generally can result in the formation of additional carbon monoxide (CO).

The degree of mixing of the fuel and air in the gas turbine is important to controlling emissions. In addition, if the emissions can be held constant with an increase in combustion temperature, then the gas turbine can be operated with increased efficiency.

Fuel and air mixing is generally performed in the combustion chamber or in the mixing section of a fuel nozzle. The fuel nozzle is used to inject fuel into the incoming airstream, provide a mixing region, and then direct the fuel/air mixture into the combustion chamber. In general, the fuel and the air are each provided by a stream. Improvements to the fuel and air mixing have been handled by modifying or adjusting at least one of generation of air swirl, the type of fuel nozzles, and locations of the fuel nozzles relative to the stream of air. For example, the use of vanes in the stream of air is one way to increase swirl. Even with the improvements described above, some degree of uneven mixing still occurs.

Therefore, what are needed are techniques to improve the mixing of fuel and air for combustion in a gas turbine.

BRIEF DESCRIPTION OF THE INVENTION

Disclosed is a gas turbine system including a source of gas coupled to a source of fuel wherein the gas and the fuel are combined to form a mixture of gas and fuel prior to the mixture being introduced to a fuel nozzle of the gas turbine system.

Also disclosed is a gas turbine including an air-line comprising air, the air-line coupled to a fuel-line comprising a gas wherein the air and the gas are combined to form a mixture of air and gas prior to the mixture being introduced to a fuel nozzle of the gas turbine; and a control system for controlling a ratio of air and gas in the mixture.

Also disclosed is a method for operating a gas turbine, the method including receiving air from a source of air; receiving fuel from a source of fuel; and mixing the air with the fuel to form a mixture of air and fuel prior to the mixture being introduced to a fuel nozzle of the gas turbine.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

FIG. 4 illustrates an exemplary graph of nitrous oxide emissions versus flame temperature.

DETAILED DESCRIPTION OF THE INVENTION

The teachings provide embodiments of apparatus and methods for mixing fuel and air prior to combustion in a gas turbine. In particular, the apparatus and methods provide for more even mixing of the fuel and the air than the mixing performed in the prior art. In one embodiment of the prior art, the fuel and the air are injected separately towards the head-end of a combustion chamber in the gas turbine. The fuel is injected using a fuel nozzle supplied by a fuel line. In the combustion chamber, the fuel and the air are mixed using swirl among other features prior to combustion. The teachings provide for pre-mixing the fuel with an amount of air prior to the mixture entering the fuel nozzle. In a non-limiting embodiment, the fuel is mixed with the amount of air in the fuel line. The amount of air is selected to preclude combustion prior to entering the fuel nozzle. In the embodiments presented below, natural gas is used as the fuel. Using natural gas as the fuel, mixtures of about fifty percent natural gas and about fifty percent air by volume at 2.758 MPa (400 psia) will generally preclude combustion as is known to those skilled in the art of natural gas combustion.

For convenience, certain definitions are provided before the teachings are discussed in detail. The term "gas turbine" relates to a continuous combustion engine. The gas turbine generally includes a compressor, a combustion chamber and a turbine. The compressor compresses air for combustion in a combustion chamber. Hot gasses exit the combustion chamber and turn a turbine. The turbine is coupled to a shaft, which may also be coupled to an electric generator. Power generated by the gas turbine can be used to turn the electric generator to generate electricity. The term "fuel-line" relates a line for transporting fuel to a fuel nozzle. The term "fuel nozzle" relates to a nozzle used to inject fuel, and often air, into the combustion chamber. Fuel nozzles can be of various designs. In one embodiment, a combustible mixture of fuel and air is formed at the tip of the fuel nozzle adjacent to the combustion chamber. The term "equivalence ratio" relates to a fuel/air ratio divided by the stoichiometric fuel/air ratio. The term "unmixedness" relates to how well fuel and air are mixed in a volume. In particular, unmixedness refers to the standard deviation of equivalence ratios of mixtures throughout the volume divided by the average of the equivalence ratios. For example, if the standard deviation of the equivalence ratios of mixtures throughout a volume is 0.025 and the average equivalence ratio is 0.5, then the unmixedness of the mixture is five percent (0.05). The term "inlet bleed-heat air" relates to air extracted from the compressor before the air is sent to the combustion chamber. The extracted air is generally heated from the compressing and directed to the inlet of the compressor.

Figure 1:
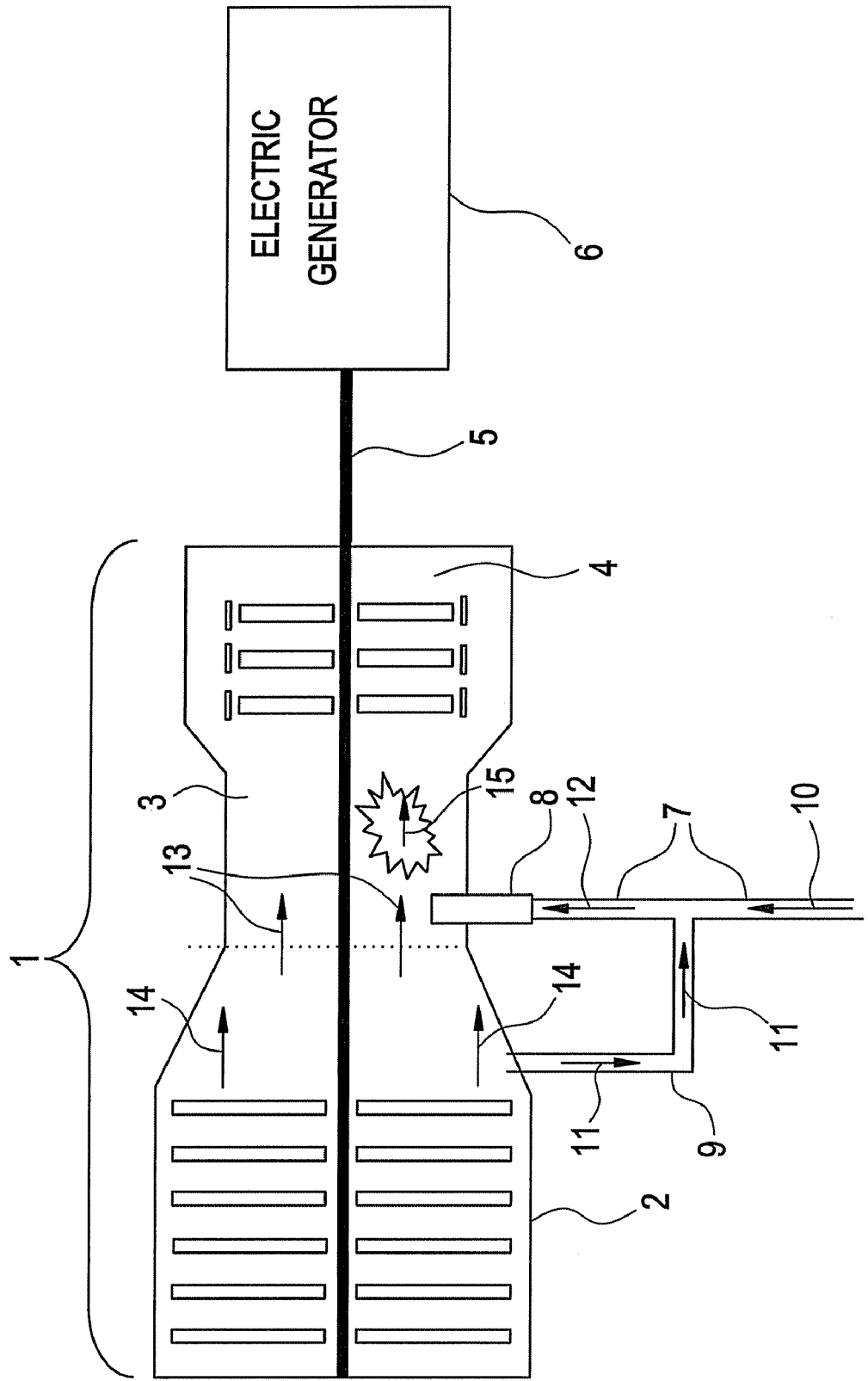
FIG. 1 illustrates an exemplary embodiment of a gas turbine.

FIG. 1 illustrates an exemplary embodiment of a gas turbine 1. The gas turbine 1 includes a compressor 2, a combustion chamber 3, and a turbine 4. The compressor 2 is coupled to the turbine 4 by a shaft 5. In the embodiment of FIG. 1, the shaft 5 is also coupled to an electric generator 6. The compressor 2 provides compressor air 14.

Referring to FIG. 1, a fuel-line 7 is coupled to a fuel nozzle 8. The fuel nozzle 8 can inject one of fuel and an air-fuel mixture. Also depicted in FIG. 1 is an air-line 9 coupled on one end to the compressor 2 and on the other end to the fuel-line 7. In accordance with the teachings herein, a portion of the compressor air 14 (referred to herein as "pre-mix air 11") is diverted to the air-line 9. The air-line 9 provides the pre-mix air 11 to the fuel-line 7. In the fuel-line 7, the pre-mix air 11 and the fuel 10 are mixed to form an air-fuel mixture 12. The air-fuel mixture 12 is injected via the fuel nozzle 8 into the combustion chamber 3 where the air-fuel mixture 12 is combined with air not diverted from the compressor air 14 (referred to herein as "direct-air 13") prior to combustion. The air-fuel mixture 12 and the direct air 13 combine to form a combustible mixture 15 that ignites in the combustion chamber 3. In one embodiment, the sum of pre-mix air 11 and direct-air 13 is essentially the same as the amount of combustion air required if there was no pre-mixing of the fuel 10 and the pre-mix air 11. In order to preclude combustion of the air-fuel mixture 12 in the fuel-line 7, an amount of the pre-mix air 11 to be pre-mixed with the fuel 10 is controlled by a control system to provide a safe non-combustible air-fuel mixture 12.

Figure 2:
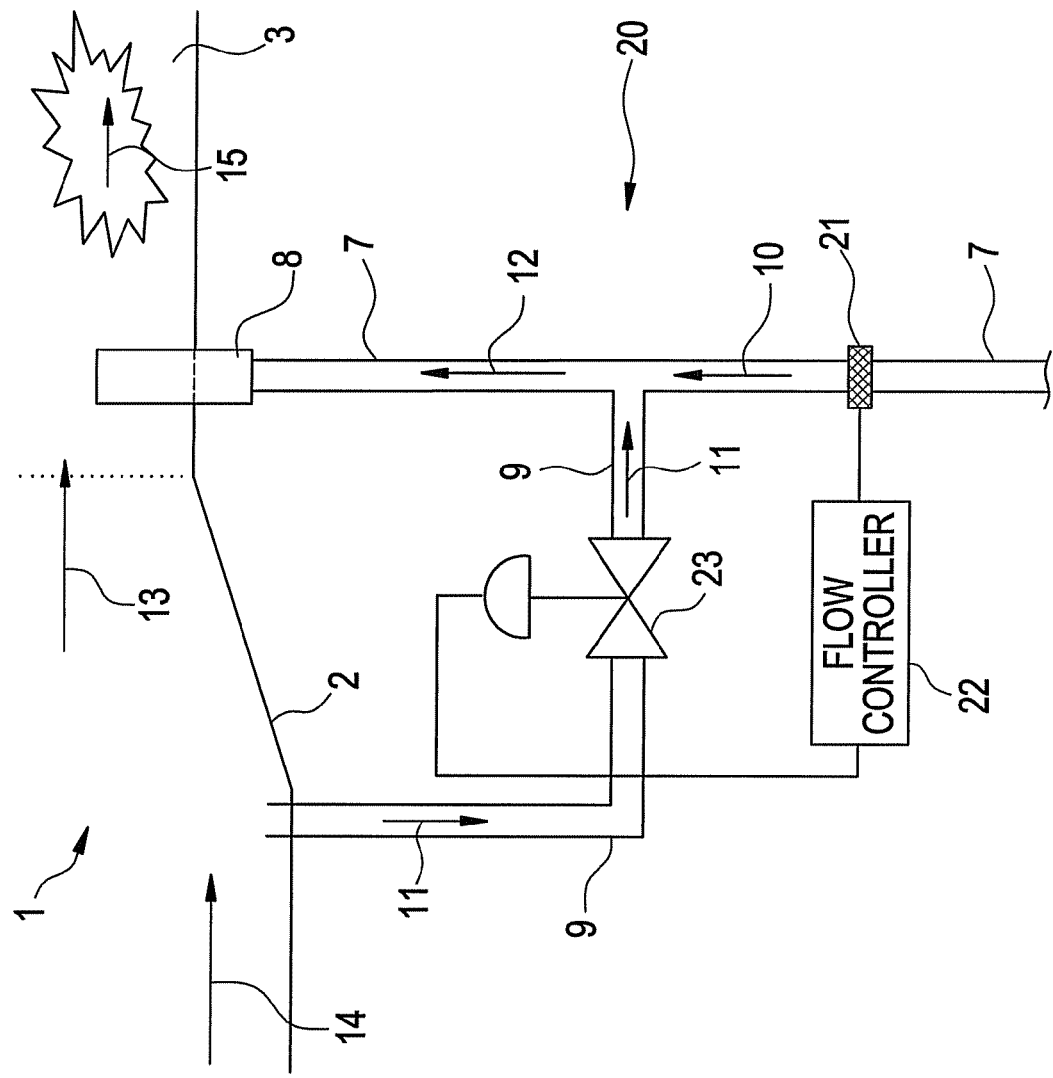
FIG. 2 illustrates an exemplary embodiment of a control system for pre-mixing air and fuel.

FIG. 2 illustrates an exemplary embodiment of a control system 20 for providing the safe air-fuel mixture 12. In the embodiment of FIG. 2, a flow sensor 21 measures the flow of the fuel 10 in the fuel-line 7. A controller 22 receives information related to the flow of the fuel 10 and controls a flow control valve 23 based on the information. The flow control valve 23 regulates the amount of pre-mix air 11 that is to be pre-mixed with the fuel 10. An exemplary embodiment of the flow sensor 21 is a variable orifice as is known to those skilled in the art of flow sensing.

Figure 3A:
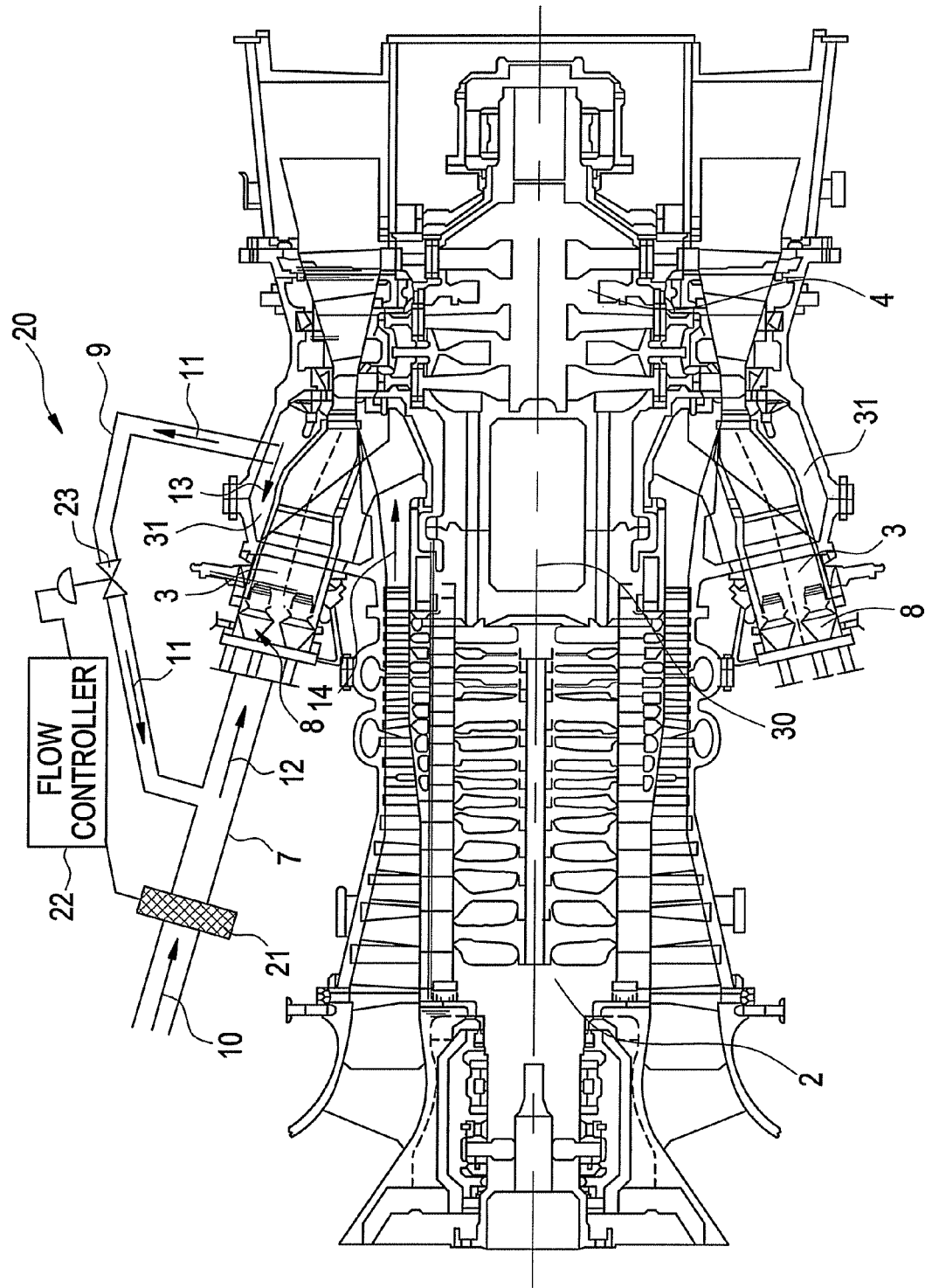
FIGS. 3A and 3B, collectively referred to as FIG. 3, illustrate another exemplary embodiment of the gas turbine with premixing of fuel and air.

FIG. 3 illustrates another exemplary embodiment of the gas turbine 1. In this embodiment, the gas turbine 1 includes a plurality of fuel nozzles 8 coupled to a plurality of associated combustion chambers 3 as depicted in FIG. 3A. In general, the combustion chambers 3 are disposed circumferentially about a center axis 30. For teaching purposes, FIG. 3A depicts the control system 20 for one fuel nozzle 8 and associated combustion chamber 3. The teachings provide the control system 20 to control the air-fuel mixture 12 delivered to each of the fuel nozzles 8.

Referring to FIG. 3A, the compressor air 14 enters a plenum 31 where a portion of the compressor air 14 is diverted as the pre-mix air 11. Flow of the pre-mix air 11 is regulated by the flow control system 20.

Figure 3B:
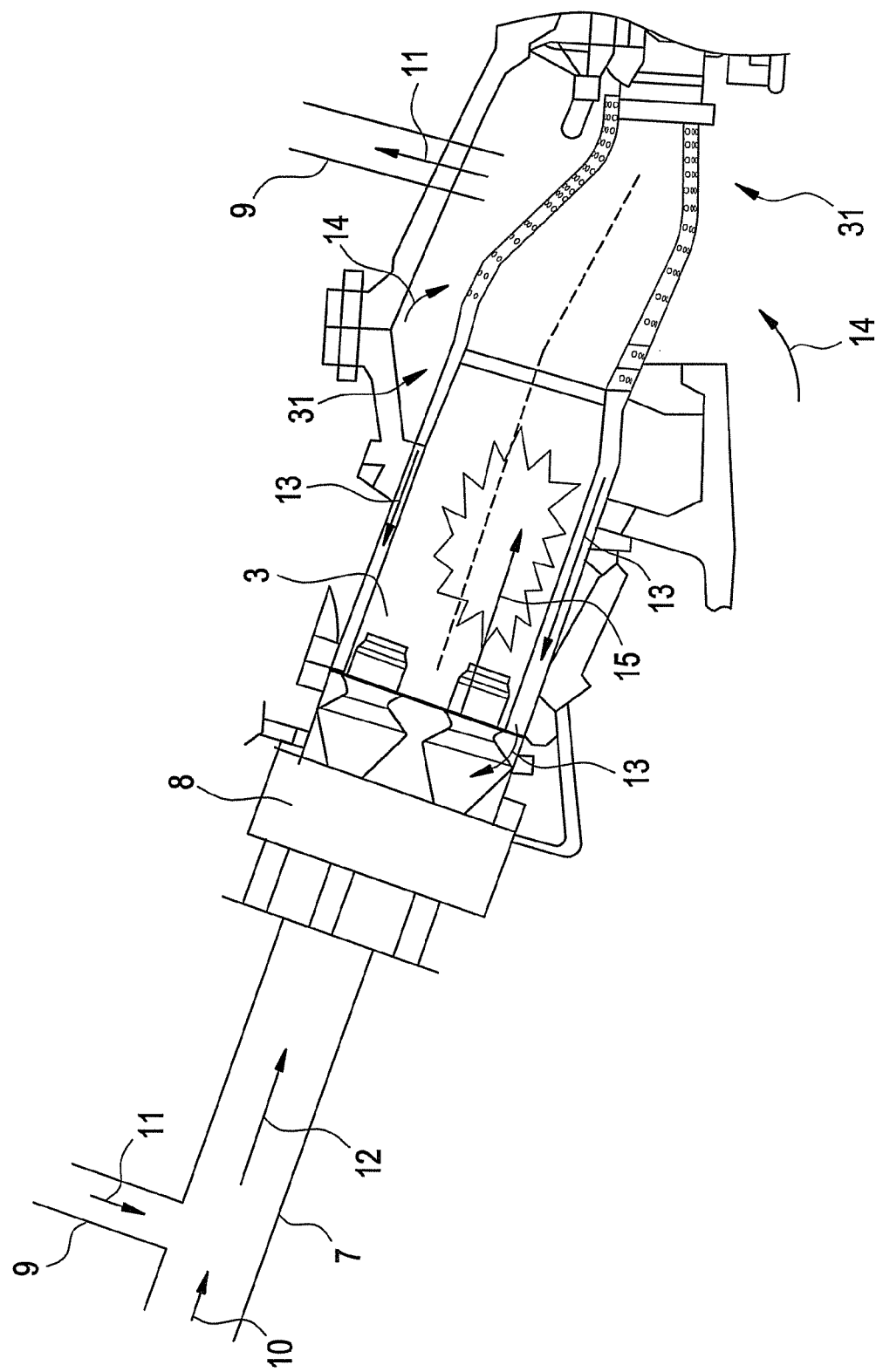

FIG. 3B illustrates a more detailed view of the flow nozzle 8 and the associated combustion chamber 3. Referring to the embodiment of FIG. 3B, the direct air 13 from the plenum 31 enters an annulus of the combustion chamber 3 and flows towards the flow nozzle 8. At the flow nozzle 8, the direct air 13 combines with the air-fuel mixture 12 to form the combustible mixture 15. The combustible mixture 15 is ignited in each combustion chamber 3.

The use of the teachings herein provide at least one of a decrease in emissions of nitrous oxides ($NO_x$) and an increase in efficiency of the gas turbine 1. FIG. 4 presents an exemplary graph depicting the effects of unmixedness on emissions of $NO_x$. The graph illustrates plots of $NO_x$ emissions versus flame temperature in the combustion chamber 3 for different percentages of unmixedness. As seen in FIG. 4 with respect to the plot of ten percent unmixedness (S=10%), at a constant level of $NO_x$ emissions, a one percent improvement in unmixedness allows for an increase in the flame temperature of approximately 8.33° C. (15° F.). The increase in temperature can relate to an increase in efficiency of the gas turbine 1. In combined cycle applications of the gas turbine 1, the 8.33° C. (15° F.) increase in flame temperature can result in about a 0.1% increase in combined cycle efficiency. Alternatively, at a constant flame temperature, the $NO_x$ emissions decrease approximately two ppm with a one percent improvement in unmixedness.

Figure 5:
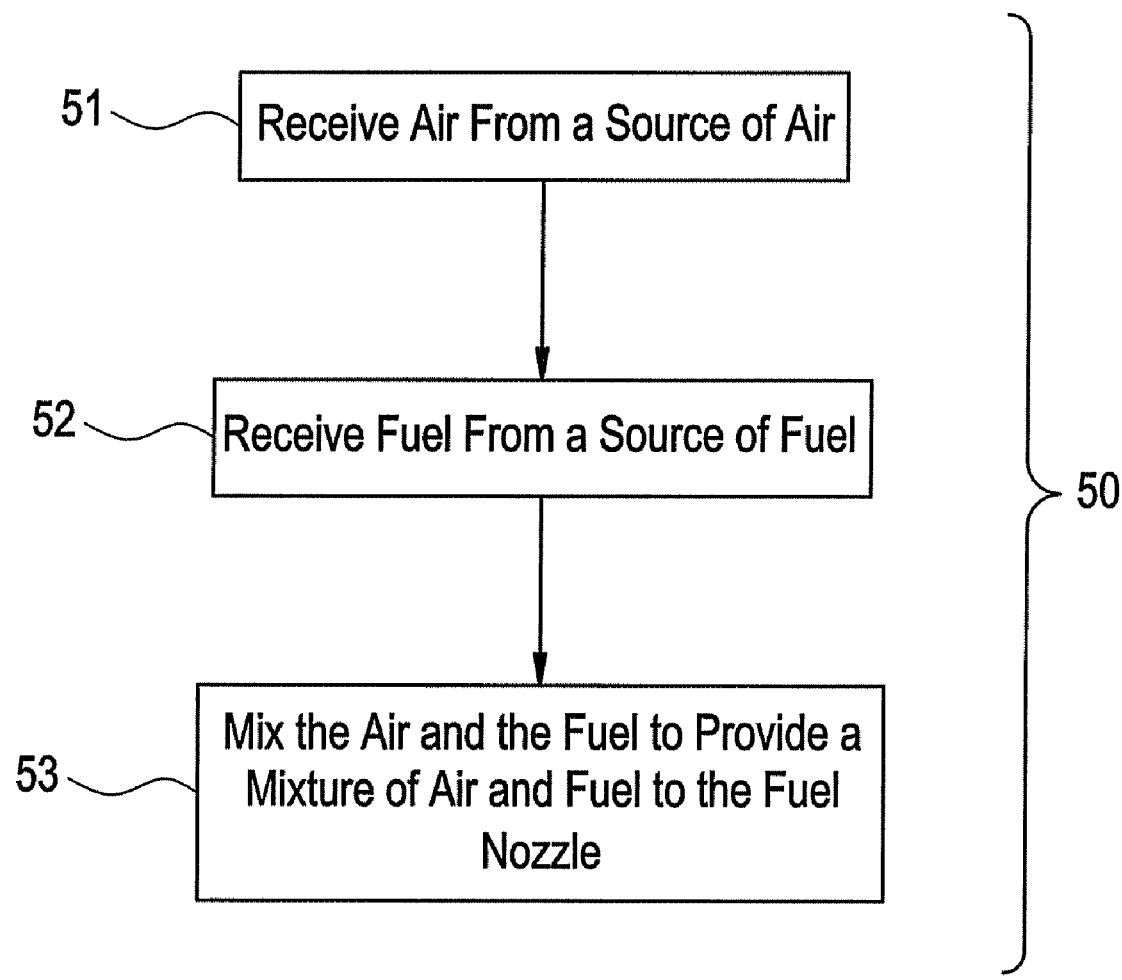
FIG. 5 presents an exemplary method for operating the gas turbine.

FIG. 5 presents an exemplary method 50 for operating the gas turbine 1. The method 50 calls for receiving 51 pre-mix air 11 from a source of air. Further, the method 50 calls for receiving 52 the fuel 10 from a source of fuel. Further, the method 50 calls for mixing 53 the pre-mix air 11 with the fuel 10 to provide a mixture of air and fuel to the fuel nozzle 8.

The embodiments presented above are not intended to be limiting. The teachings provide for pre-mixing the pre-mix air 11 with the fuel 10 prior to the air-fuel mixture 12 being combined with the direct air 13. In certain embodiments, the pre-mixing may be performed in at least one of the fuel line 7, the fuel nozzle 8, a mixing chamber, and in suitable components known to those skilled in the art of gas turbines. Mixing of the air-fuel mixture 12 with the direct air 13 may be performed in at least one of the fuel nozzle 8, the combustion chamber 3, and in suitable components known to those skilled in the art of gas turbines. In certain embodiments, the pre-mix air 11 may be obtained from at least one of the compressor 2, inlet bleed-heat air, and any suitable source of air known to those skilled in the art of gas turbines.

While the discussion above is with respect to using natural gas as the fuel 10, other fuels, such as gasified coal, or a combination of fuels and inerts in at least one of a gaseous state and a liquid state may be used. The teachings provide that the air-fuel mixture 12 preclude combustion prior to combining with the direct air 13 to form the combustible mixture 15. A ratio of fuel 10 and pre-mix air 11 that precludes combustion may be determined by those skilled in the art of combustion of the type of fuel 10 selected.

In the embodiments presented above, air is used as the gas that is input to the compressor 2. In other embodiments of the teachings herein, other gases may be included with the air. Examples of the other gases include carbon dioxide, steam, and additional nitrogen over the concentration of nitrogen in air.

Various components may be included and called upon for providing for aspects of the teachings herein. For example, the control system 20 may include at least one of an analog system and a digital system. The digital system may include at least one of a processor, memory, storage, input/output interface, input/output devices, and a communication interface. In general, a computer program product stored on machine-readable media and including machine executable instructions can be input to the digital system. The computer program product may include instructions that can be executed by the processor for pre-mixing the pre-mix air 11 with the fuel 10 at a ratio that precludes combustion of the air-fuel mixture 12 prior to the air-fuel mixture 12 being introduced to the fuel nozzle 8. The various components may be included in support of the various aspects discussed herein or in support of other functions beyond this disclosure. The technical effect of the computer program product is to increase the efficiency and limit the emissions of the gas turbine 1.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A gas turbine system comprising:
   a fuel nozzle;
   a fuel line connected to the fuel nozzle, the fuel line communicative with a source of fuel and the fuel nozzle;
   a gas line connected to the fuel line, the gas line communicative with a source of gas and the fuel line, wherein the gas and the fuel are combined in a portion of the fuel line to form a mixture of gas and fuel prior to the mixture being introduced to the fuel nozzle of the gas turbine system, and
   a control system comprising at least one sensor operative to measure a flow of fuel in the fuel line, a control valve operative to regulate a flow of gas from the source of gas, and a controller operative to receive a measurement of the flow of fuel from the sensor and to control the control valve responsive to the measurement of the flow of fuel.

2. The gas turbine system as in claim 1, wherein the gas is air.

3. The gas turbine system as in claim 1, wherein the gas comprises air and at least one of carbon dioxide, additional nitrogen, and steam.

4. The gas turbine system as in claim 1, wherein the fuel is in at least one of a gaseous state and a liquid state.

5. The gas turbine system as in claim 1, wherein the source of gas comprises a line coupled to a plenum that receives gas from a compressor.

6. A gas turbine comprising:
   a fuel nozzle;
   a fuel line connected to the fuel nozzle, the fuel line communicative with a source of fuel and the fuel nozzle;
   an air-line connected to the fuel line, the air-line communicative with a source of air and the fuel line wherein the air and fuel are combined in a portion of the fuel line to form a mixture of air and fuel prior to the mixture being introduced to the fuel nozzle; and
   a control system for controlling a ratio of air and fuel in the mixture, wherein the control system comprises at least one sensor operative to measure a flow of fuel in the fuel line, a control valve operative to regulate a flow of gas from the source of gas, and a controller operative to receive a measurement of the flow of fuel from the sensor and to control the control valve responsive to the measurement of the flow of fuel.

* * * * *